(12) United States Patent
Kowalewski

(10) Patent No.: US 9,521,532 B2
(45) Date of Patent: *Dec. 13, 2016

(54) COMMUNICATION TERMINAL DEVICE AND METHOD FOR CONTROLLING

(71) Applicant: INTEL DEUTSCHLAND GMBH, Neubiberg (DE)

(72) Inventor: Frank Kowalewski, Goettingen (DE)

(73) Assignee: INTEL DEUTSCHLAND GMBH, Neubiberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/924,919

(22) Filed: Oct. 28, 2015

(65) Prior Publication Data
US 2016/0050549 A1   Feb. 18, 2016

Related U.S. Application Data

(63) Continuation of application No. 13/759,162, filed on Feb. 5, 2013, now Pat. No. 9,226,338.

(51) Int. Cl.
*H04W 4/18* (2009.01)
*H04W 88/04* (2009.01)
(Continued)

(52) U.S. Cl.
CPC ............ *H04W 4/18* (2013.01); *H04L 65/1006* (2013.01); *H04L 65/1069* (2013.01); *H04W 4/06* (2013.01);
(Continued)

(58) Field of Classification Search
CPC ................................ H04W 4/18; H04W 88/04
(Continued)

(56) References Cited

U.S. PATENT DOCUMENTS 7,725,110 B2   5/2010   Weigand
7,751,316 B2   7/2010   Yarlagadda et al.
(Continued)

FOREIGN PATENT DOCUMENTS

EP   1613006 A1   1/2006
WO   2008058822 A1   5/2008

OTHER PUBLICATIONS

3GPP Tr 22.803 V12.0.0; 3rd Generation Partnership Project; Technical Specification Group Services and System Aspects: Feasibility study for Proximity Services (ProSe) (Release 12); 3GPP Standard; Mobile Competence Centre; 650, Route Des Lucioles; F-06921 Sophia Antipolis Cedex; France; vol. SA WG1, No. V12.0.0; Dec. 18, 2012, pp. 1-40, XP050691103, [retrieved on Dec. 18, 2012]; Paragraph 5.2.9.

(Continued)

*Primary Examiner* — Mark Rinehart
*Assistant Examiner* — Peter Solinsky
(74) *Attorney, Agent, or Firm* — Schwabe, Williamson & Wyatt, P.C.

(57) ABSTRACT

In various aspects of this disclosure, a communication terminal device may be provided. The communication terminal device may include a receiver. The receiver may be configured to receive a message from a first communication device. The communication terminal device may further include a circuit configured to provide a communication device to communication device communication. The communication terminal device may further include a controller. The controller may be configured to determine whether to relay the received message to at least one second communication device. The controller may further be configured to modify the message if the controller determined to relay the received message. The controller may further be configured (Continued)

to relay and transmit the modified message to the at least one second communication device.

15 Claims, 9 Drawing Sheets

(51) Int. Cl.
| | |
|---|---|
| *H04W 4/08* | (2009.01) |
| *H04L 29/06* | (2006.01) |
| *H04W 4/06* | (2009.01) |
| *H04W 4/12* | (2009.01) |
| *H04W 88/06* | (2009.01) |

(52) U.S. Cl.
CPC .............. *H04W 4/08* (2013.01); *H04W 4/12* (2013.01); *H04W 88/04* (2013.01); *H04W 88/06* (2013.01)

(58) Field of Classification Search
USPC ........................................................ 370/315
See application file for complete search history.

(56) References Cited

U.S. PATENT DOCUMENTS

| | | | |
|---|---|---|---|
| 7,962,094 B2 | 6/2011 | Weigand | |
| 8,023,957 B2 | 9/2011 | Weigand | |
| 8,073,114 B2 | 12/2011 | Mostafa | |
| 8,218,471 B2 | 7/2012 | Masuda | |
| 8,463,307 B1 | 6/2013 | Zhou et al. | |
| 9,226,338 B2 * | 12/2015 | Kowalewski | H04W 88/04 |
| 2004/0095923 A1 | 5/2004 | Ejzak et al. | |
| 2006/0041688 A1 | 2/2006 | Wright et al. | |
| 2007/0070983 A1 | 3/2007 | Redi et al. | |
| 2008/0225775 A1 | 9/2008 | Proctor et al. | |
| 2008/0248763 A1 | 10/2008 | Park et al. | |
| 2008/0307072 A1 | 12/2008 | Sathish | |
| 2009/0022299 A1 | 1/2009 | Bakshi et al. | |
| 2009/0116635 A1 | 5/2009 | Erhart et al. | |
| 2009/0190573 A1 | 7/2009 | Siegel et al. | |
| 2009/0279455 A1 | 11/2009 | Wang et al. | |
| 2010/0029257 A1 | 2/2010 | Ariyoshi | |
| 2010/0169495 A1 | 7/2010 | Zhang et al. | |
| 2010/0203875 A1 | 8/2010 | Nishimori | |
| 2012/0173901 A1 | 7/2012 | Soliman et al. | |
| 2012/0243461 A1 | 9/2012 | Bucknell et al. | |
| 2013/0016728 A1 | 1/2013 | Hiie et al. | |
| 2014/0003432 A1 | 1/2014 | Haserodt | |
| 2014/0004865 A1 | 1/2014 | Bhargava et al. | |
| 2014/0051473 A1 | 2/2014 | Weigand | |
| 2014/0161038 A1 | 6/2014 | Lothrop | |
| 2014/0192667 A1 | 7/2014 | Kalapatapu et al. | |

OTHER PUBLICATIONS

International Search Report and Written Opinion received for PCT Patent Application No. PCT/EP2014/050239, mailed Jun. 6, 2014, 13 pages.
3GPP Organizational Partners, Feasibility Study for Proximity Services, 3GPP TR 22.803 V1.0.0, Aug. 2012, 33 pages.
J. Rosenberg et al., SIP: Session Initiation Protocol, Network Working Group Request for Comments: 3261, Jun. 2002, 270 pages.
H. Schulzrinne et al., RTP: A Transport Protocol for Real-Time Applications, Network Working Group Request for Comments: 3550, Jul. 2003, 89 pages.
IEEE Std 802. Nov. 2007 "Local and Metropolitan Networks—Specific Requirements"; p. 304 "Part 11: Wireless LAN MAC and PHY Specifications"; pp. 23 and 60-63.
Taiwanese Patent Office; Office Action and Search Report for Taiwanese App. No. 103101618 dated Sep. 11, 2015; 16 pages with English translation.

* cited by examiner

COMMUNICATION TERMINAL DEVICE AND METHOD FOR CONTROLLING

CROSS-REFERENCE TO RELATED APPLICATION

This application is a continuation of U.S. patent application Ser. No. 13/759,162 filed Feb. 5, 2013, which is hereby incorporated by reference in its entirety.

TECHNICAL FIELD

Various aspects of this disclosure relate generally to communication terminal devices and methods for controlling the communication terminal devices.

BACKGROUND

Communication terminal devices may directly communicate with base stations in a cellular communication system. All end devices of a centralized group communication system must be connected to the central group communication server. End devices that are only connected to a single other end device of a centralized group communication system cannot communicate with the rest of the group. Furthermore, communication terminal devices that are also provided with a short range wireless transceiver may serve as a relaying device to the base station for other communication terminal devices. The other communication terminal devices may also be communicating with the cellular mobile communication system via a short range wireless transceiver and the communication terminal device, even without being in direct connection with a base station of the cellular mobile communication system. If an end device simply relays communication data from a group communication server to another end device then communication data would be sent twice to the relaying end device. This unnecessarily would consume communication resources. And, if an end device simply relays communication data from another end device to a group communication server then relayed communication data from the other end device would be sent back to the relaying end device from the server. This unnecessarily would consume communication resources, too.

SUMMARY

A communication terminal device may be provided. The communication terminal device may include a receiver. The receiver may be configured to receive a message from a first communication device. The communication terminal device may further include a circuit configured to provide a communication device to communication device communication. The communication terminal device may further include a controller. The controller may be configured to determine whether to relay the received message to at least one second communication device. The controller may further be configured to modify the message if the controller determined to relay the received message. The controller may further be configured to relay and transmit the modified message to the at least one second communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the drawings, the left-most digit(s) of a reference number can identify the drawing in which the reference number first appears. The same numbers can be used throughout the drawings to reference like features and components. In the following description, various aspects of this disclosure are described with reference to the following drawings, in which.

DESCRIPTION

Figure 1:
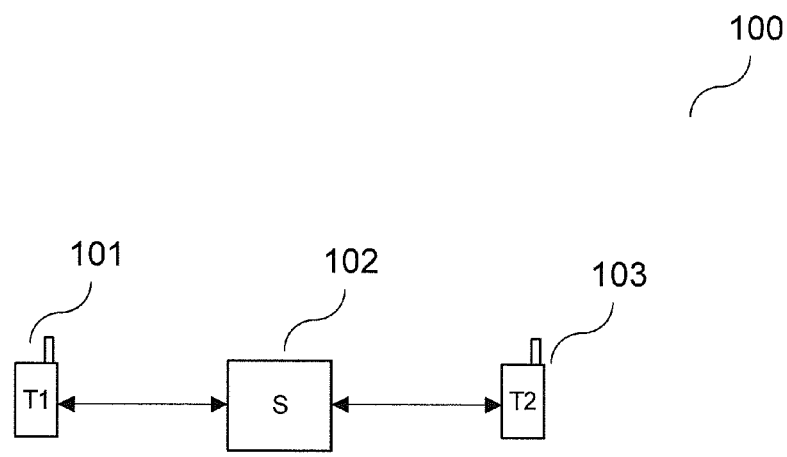
FIG. 1 shows a server based communication system architecture.

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any aspect or design described herein as "exemplary" is not necessarily to be construed as preferred or advantageous over other aspects or designs.

A communication device (e.g. terminal device or communication terminal device) as referred to herein may be a device configured for wired communication, for example a desktop computer or laptop, or for wireless communication, for example a radio communication device. Furthermore, a radio communication device may be an end-user mobile device (MD) (which may also be referred to as communication terminal device). A radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m.

The communication device may include a memory which may for example be used in the processing carried out by the communication device. A memory may include e.g. a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

The components of the communication device (e.g. an oscillator, an accuracy determiner, a signal detector, a controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

A description will be provided for various devices as well as for various methods. It will be understood that basic properties of the devices also hold for the methods and vice versa. Therefore, for sake of brevity, duplicate description of such properties may be omitted.

It will be understood that any property described herein for a specific device (e.g. communication device) may also hold for any other device described herein. It will be understood that any property described herein for a specific method may also hold for any other method described herein.

Devices and methods may be provided for managing radio resources for a cellular wide area radio communication connection based on radio resources at least one of provided or to be provided for a communication terminal device to communication terminal device communication bypassing a radio access network.

FIG. 1 shows a server based communication system architecture 100.

Communication systems can be server based or non-server based. In server based systems, as shown in FIG. 1, communication terminal devices T1 101, T2 103 do not communicate with each other directly but send communication data and receive communication data via a central communication server S 102 (which may also be referred to as communication network server S 102) which is located within the communication network and may provide a communication connection between the communication terminal devices T1 101, T2 103. By way of example, various cellular communication systems may follow this principle. Terminal devices T1 101 and T2 103 may each be connected via a wireless or radio connection to the communication network server S 102.

Figure 2:
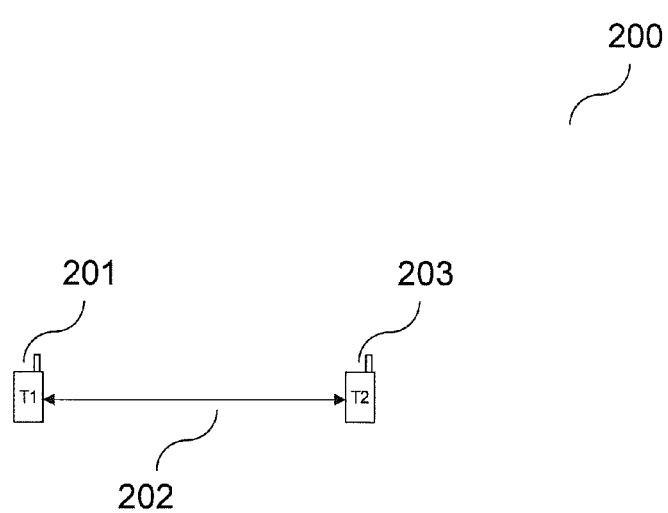
FIG. 2 shows a non-server based communication system architecture.

FIG. 2 shows a non-server based communication system architecture 200.

In a non-server based communication system, as shown in FIG. 2, communication terminal devices T1 201, T2 203 can directly send and receive communication data to and from other communication terminal devices T1 201, T2 203. By way of example, Wireless Local Area Network (WLAN) direct mode may follow this principle. As shown in FIG. 2, the terminal device T1 201 and the terminal device T2 203 are connected directly to each other.

Figure 3:
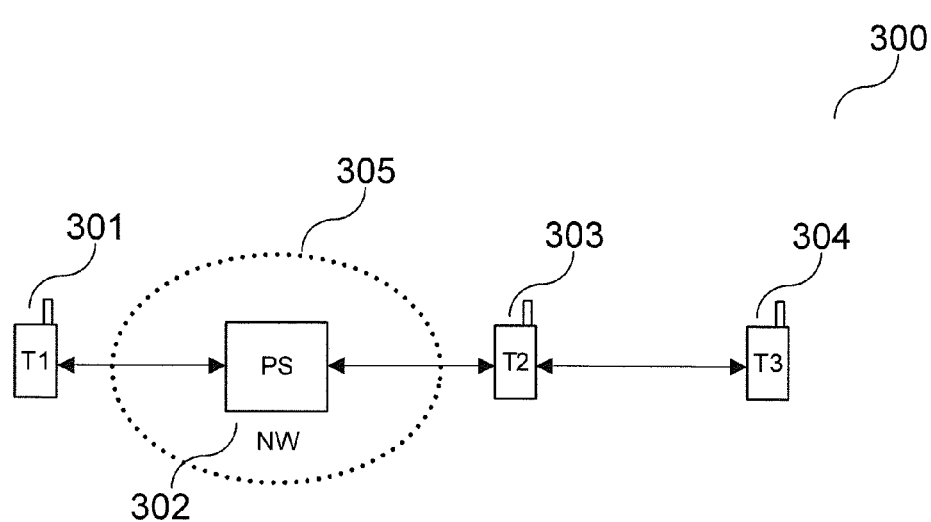
FIG. 3 shows a communication system architecture with network and direct communication connections.

FIG. 3 shows a communication system architecture 300 with network and direct communication connections.

Communication systems may be configured to provide so-called group communication services. In a group communication, a group of terminal devices (herein also referred as communication terminal devices) 301, 303, 304 are communicating with each other. By way of example, communication data of a particular terminal device 301 may be distributed to all other terminal devices 303, 304 of the respective group.

Various group communication systems may be based on a centralized architecture having a central group communication server 302. Every terminal device may be connected to the central group communication server 302. The central group communication server 302 may distribute communication data to the connected terminal devices.

Group communication may restrict communication data transmission to a single terminal device of a group at a time, e.g. only one of the group's terminal device users are allowed and thus enabled to talk (and thus only one of the group's terminal devices is allowed to transmit speech data or other multimedia data) at a time. The user's terminal device requests the right to send communication data from a so-called floor control entity, which may be located in the central group communication server 302.

In a group communication, a terminal device may set its media "on hold". If media is set "on hold" for a device, then no media is being sent to the device. If media is set "off hold" for a device, then media is being distributed to the device.

The 3GPP ($3^{rd}$ Generation Partnership Project) defines principles for Proximity Services (ProSe). ProSe may allow terminal devices either to communicate via network servers or via direct connections between the terminal devices (e.g. per WLAN). ProSe also may provide group communication services.

In IP (Internet Protocol) based communication systems, communication sessions may be usually controlled via the so-called Session Initiation Protocol (SIP).

SIP messages may be relayed by Back-to-Back User Agents (B2BUA). A B2BUA may be configured to modify relayed SIP messages before forwarding them.

In IP based communication systems, communication data may be transported via the Real-time Transport Protocol (RTP). Control information for RTP media data may be transported via the RTP Control Protocol (RTCP). RTP/RTCP data may be relayed by RTP/RTCP translators.

Referring to FIG. 3, a first user's U1 terminal device T1 301 and a second user's U2 terminal device T2 303 may be wirelessly connected to a communication system's wireless network 305. In this example, it is assumed that a third user's U3 terminal device T3 304 is not connected to the communication system's network 305 since it is out of reach of the communication system network's base stations.

The communication system network 305 may include a ProSe server PS 302 configured to provide ProSe group communication. Instead of using a single ProSe server, the communication system network 305 may provide a plurality of ProSe servers. For example, a ProSe server for general ProSe services and another (possibly separate) ProSe server for ProSe group communication services may be provided.

Group communication call control may be provided via the Session Initiation Protocol (SIP) and communication data transport may be provided via the Real-time Transport Protocol and its associated RTP Control Protocol (RTP/RTCP). The devices and methods described herein may also be used with other suitable communication protocols than SIP and/or RTP/RTCP.

Figure 4:
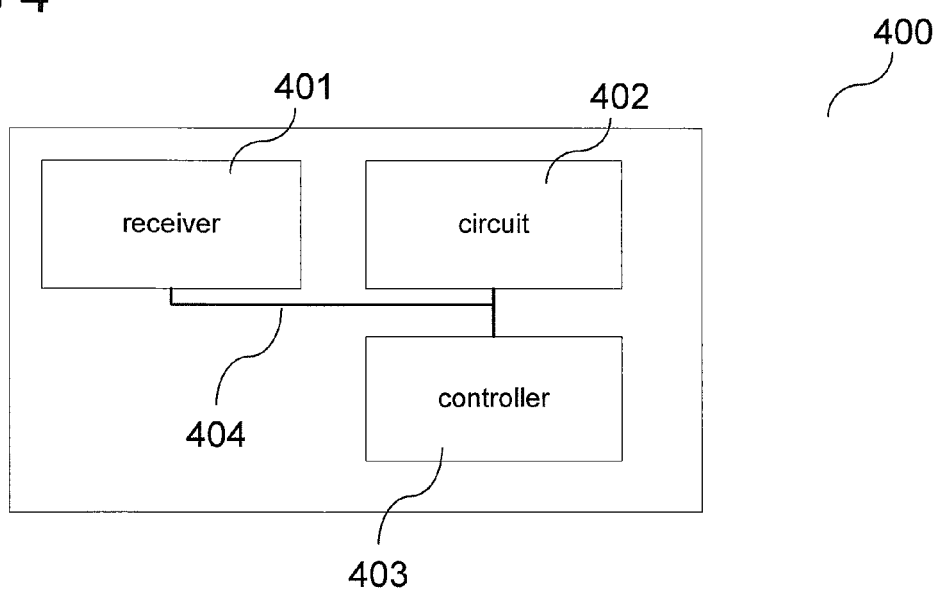
FIG. 4 shows a communication terminal device.

FIG. 4 shows a communication terminal device 400 according to various aspects of this disclosure.

The communication terminal device 400 may include a receiver 401. The receiver 401 may be configured to receive a message from a first communication device. The communication terminal device 400 may further include a circuit 402. The circuit 402 may be configured to provide a communication device to communication device communication. The communication terminal device 400 may further include a controller 403. The controller 403 may be configured to determine whether to relay the received message to at least one second communication device. The controller 403 may further be configured to modify the message if the controller 403 determined to relay the received message. The controller 403 may further be configured to relay and transmit the modified message to the at least one second communication device. The receiver 401, the circuit 402, and the controller 403 may all be coupled with each other via a connection 404 (e.g. a cable, and the like).

The communication terminal device 400 may further include a transmitter (not shown), which may be implemented together with or separate from the receiver 401. The transmitter may be configured to transmit the modified message to the at least one second communication device via a communication device to communication device communication.

The first communication terminal device may be configured as a group communication server.

The at least one second communication device may be configured as a group communication server.

Furthermore, the communication terminal device 400 may include a storage circuit (not shown). The storage circuit may be configured to store a communication status of the at least one second communication device relayed by the communication terminal device.

Furthermore, the communication terminal device 400 may be configured to relay the message received from the first communication device in accordance with the communication status stored in the storage circuit.

Furthermore, the communication terminal device 400 may include a cellular wide area radio communication technology circuit (not shown). The wide area radio communication technology circuit may be configured to provide a communication in accordance with a cellular wide area radio communication technology.

The wide area radio communication technology circuit may be configured to provide a communication in accordance with one or more of the following cellular wide area radio communication technologies:

a Global System for Mobile Communications (GSM) radio communication technology;

a General Packet Radio Service (GPRS) radio communication technology;

an Enhanced Data Rates for GSM Evolution (EDGE) radio communication technology;

a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advance (Long Term Evolution Advance)), CDMA2000 (Code division multiple access 2000), and the like).

Furthermore, the circuit 402 may be configured to provide the Session Initiation Protocol (SIP) as a communication control protocol for the communication device to communication device communication.

Furthermore, the circuit 402 may be configured to provide the Real-time Transport Protocol (RTP) as a communication data protocol for the communication device to communication device communication. The circuit may further be configured to provide the Real-time Transport Control Protocol (RTCP) as a communication data control protocol for the communication device to communication device communication. The RTP/RTCP data may be relayed by RTP/RTCP translators.

Figure 5:
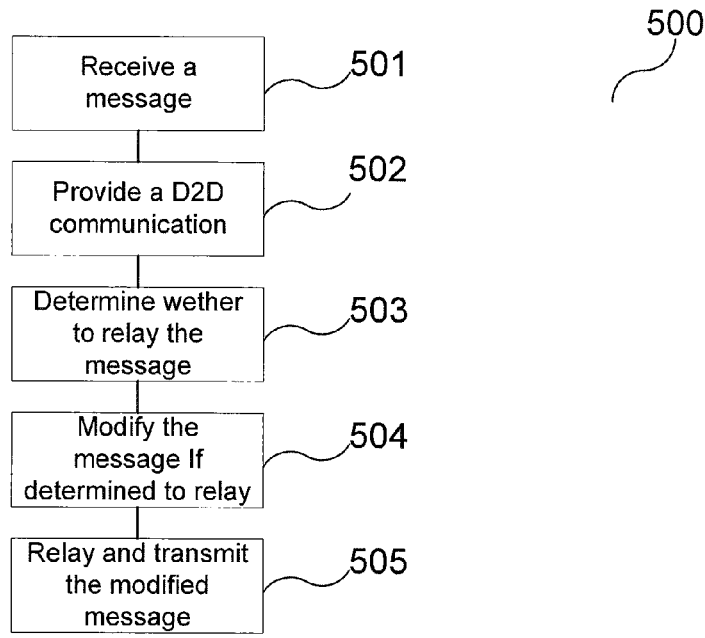
FIG. 5 shows a flow diagram illustrating a method for controlling a a communication terminal device.

FIG. 5 shows a flow diagram 500 illustrating a method for controlling a communication terminal device.

In 501, a message may be received from a first communication device. In 502, a communication device to communication device communication (D2D) may be provided. In 503, it may be determined whether to relay the received message to at least one second communication device. In 504, the message may be modified if the controller determines in 503 to relay the received message. In 505 the modified message may be relayed and transmitted to the at least one second communication device.

The message dedicated to the second communication device, which may be dedicated to and relayed to the at least one second communication device, may be sent (e.g. only) once by the first communication device.

The method may further include providing a communication control protocol for the communication device to communication device communication, wherein the communication control protocol is the Session Initiation Protocol (SIP).

The method may further include providing a communication data protocol for the communication device to communication device communication, wherein the communication data protocol is a Real-time Transport Protocol (RTP).

Moreover, the method may further include providing a communication data control protocol for the communication device to communication device communication, wherein the communication data control protocol is a Real-time Transport Control Protocol (RTCP). The RTP/RTCP data may be relayed by RTP/RTCP translators.

The method may further include transmitting the modified message to the at least one second communication device via a communication device to communication device communication.

The communication terminal device may be connected to a group communication server.

The first communication device or the at least one second communication device may be configured as a group communication server.

Furthermore, the method may include relaying a message from the at least one second communication device to the group communication server.

The method may further include storing a communication status of the at least one second communication device relayed by the communication terminal device.

The method may further include relaying the message received from the first communication device in accordance with the communication status stored in the storage circuit.

Moreover, the method may further include examining the message for information dedicated for the communication terminal device.

The communication terminal device and the at least one second communication device may support at least the same media codecs.

The method may further include providing a communication in accordance with a cellular wide area radio communication technology.

The cellular wide area radio communication technology can be one of the following:
- a Global System for Mobile Communications (GSM) radio communication technology;
- a General Packet Radio Service (GPRS) radio communication technology;
- an Enhanced Data Rates for GSM Evolution (EDGE) radio communication technology;
- a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advance (Long Term Evolution Advance)), CDMA2000 (Code division multiple access 2000), and the like).

Figure 6:
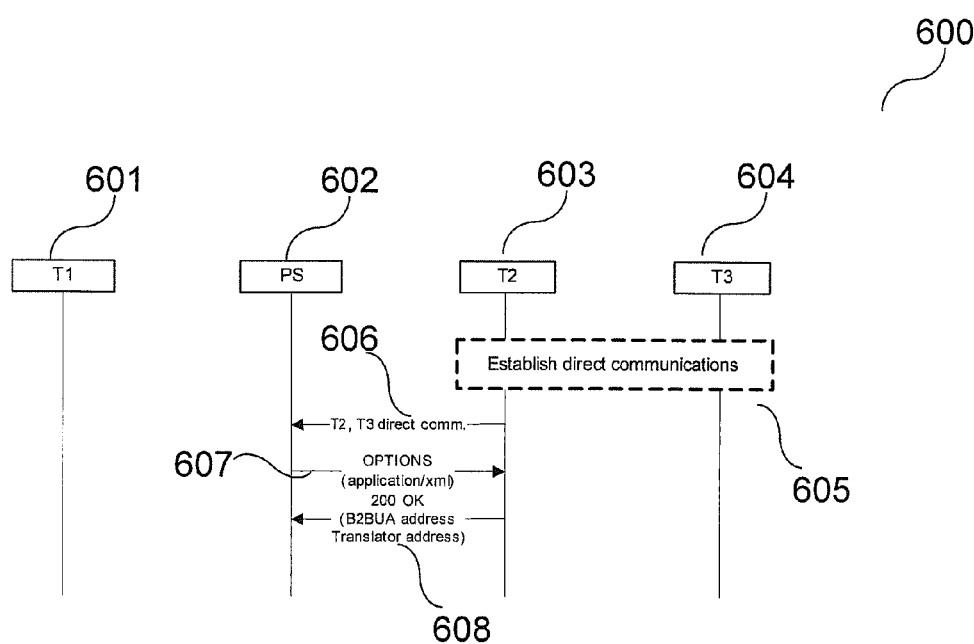
FIG. 6 shows a message flow diagram for setting up a group communication relay.

FIG. 6 shows a message flow diagram 600 for setting up group communication relay according to an aspect of this disclosure relating to the system architecture 300 as shown for example in FIG. 3.

FIG. 6 shows a first terminal device T1 601, a second terminal device T2 603, and a third terminal device T3 604, as well as a ProSe server PS 602.

The second terminal device T2 603 and the third terminal device T3 604 may come into reach, in other words into a coverage region, for direct communication via a short communication technology e.g. WLAN. Therefore, they may establish direct communication, in other words, a communication device to communication device communication, between each other in 605. The second terminal device T2 603 may inform in 606 the ProSe server PS 602 that the second terminal device T2 603 and the third terminal device T3 604 can communicate directly to each other (e.g. bypassing the ProSe server PS 602).

Then, the ProSe server PS 602 may check whether the second terminal device T2 603 supports group communication relay functionality by sending a SIP OPTIONS request in 607 to the second terminal device T2 603. The SIP OPTIONS request may include an Accept header value "application/xml".

The content of the SIP OPTIONS request for checking group communication relay capabilities in 607 may be as follows:
OPTIONS sip:T2@operator.com SIP/2.0
Max-Forwards: 70
To: sip:T2@operator.com
From: <sip:ProSe@operator.com>;tag=1928301774
Call-ID: a84b4c76e66710
CSeq: 63104 OPTIONS
Contact: <sip:ProSe@operator.com>
Accept: application/xml
Content-Length: 0

Since the second terminal device T2 603 in this example supports ProSe group communication relay functionality it may respond with a SIP 200 OK response including an XML body containing the SIP address of the second terminal device's T2 603 Back-To-Back User Agent for group communication control data relay and the second terminal device's T2 603 RTP translator address for RTP/RTCP data relay in 608.

The content of the SIP 200 OK response to the SIP OPTIONS request for checking group communication relay capabilities in 608 may be as follows:
SIP/2.0 200 OK
To: <sip:T2@operator.com>; tag=93810874
From: <sip:ProSe@operator.com>; tag=1928301774
Call-ID: a84b4c76e6670
CSeq: 63104 OPTIONS
Contact: <sip:T2@operator.com>
Allow: INVITE, ACK, CANCEL, OPTIONS, BYE
Accept: application/sdp
Accept-Language: en
Content-Type: application/xml
Content-Length: 124
<?xml version="1.0" encoding="UTF-8"?>
<group-comm-support>
<B2B-address uri="sip:gcr.T2@operator.com"/>
<translator-address ip-address="224.2.17.12/127"/>

Instead of sending a SIP OPTIONS request with Accept header value "application/xml" for checking ProSe group communication relay capabilities other Accept header values may be used. A new MIME type especially for ProSe group communication relay may be used, e.g. "application/prose-capabilities" may be used.

Instead of sending a SIP OPTIONS request to a terminal device's terminal device SIP address for checking ProSe group communication relay capabilities the request may be sent to a group communication relay specific SIP address of the terminal device, e.g. to a SIP address derived from the terminal device's terminal device SIP address (e.g. "sip:gcr.enddeviceaddress").

Instead of sending a SIP OPTIONS request with an Accept header value for checking ProSe group communication relay capabilities a SIP OPTIONS request without an Accept header value may be sent to a group communication specific SIP address of the relaying terminal device. In this case, a transaction timeout indicates "no support" for group communication relay.

Figure 7:
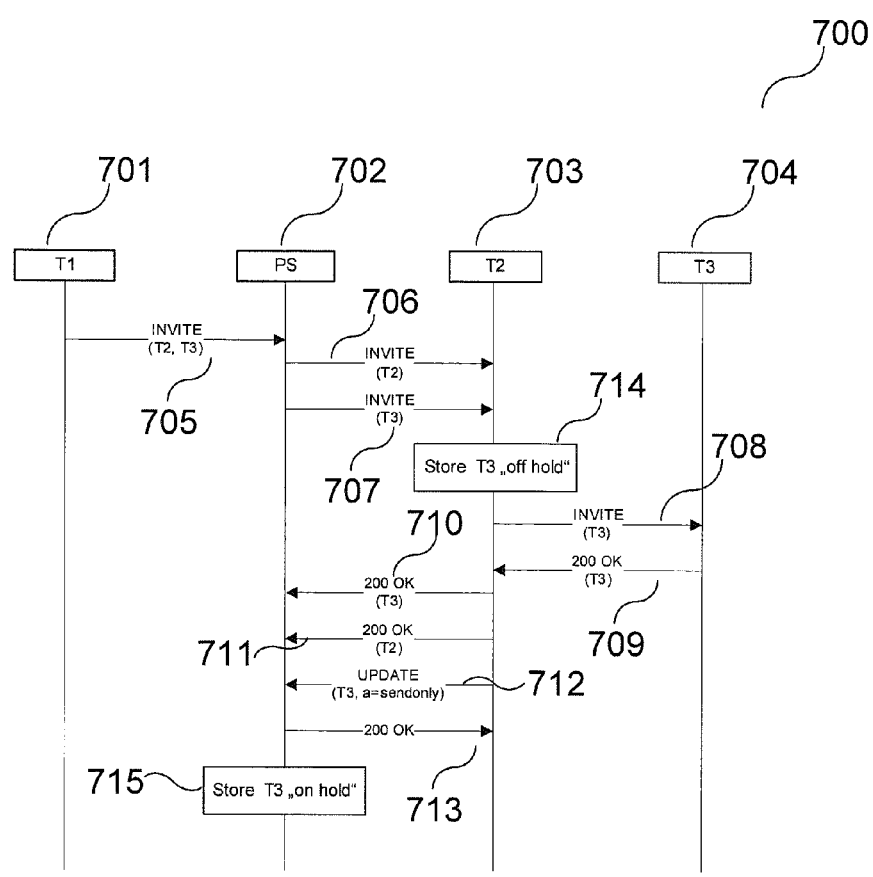
FIG. 7 shows a message flow diagram for setting up a group communication call with relay.

FIG. 7 shows a message flow diagram 700 for setting up a group communication call with relay.

FIG. 7 shows a first terminal device T1 701, a second terminal device T2 703, and a third terminal device T3 704, as well as a ProSe server PS 702.

It is assumed that a first user U1 initiates a group call with the second terminal device T2 703 and the third terminal device T3 704 with his first terminal device T1 701. The first terminal device T1 701 may send in 705 a SIP INVITE request to the ProSe server PS 702 including a feature tag "+g.3gpp.group-comm" in an Accept-Contact header to indicate the group call purpose. The server PS 702 may then initiate one or more communication sessions with the second terminal device T2 703 and the third terminal device T3 704 by sending SIP INVITE requests in 706 and 707 to the second terminal device T2 703 and the third terminal device T3 704. The SIP INVITE request in 707 transmitted to the third terminal device T3 704 may include a Route header value "gcr.T2@operator.com" in order to force the request to be routed through the second terminal device T2 703.

The content of the SIP INVITE request in 707 to the relay terminal device may be as follows:

INVITE sip:T3@operator.com SIP/2.0
To: <sip:T3@operator.com>
From: <sip:ProSe@operator.com>; tag=xfg9
Call-ID: 3413an89KU
Route: sip:gcr.T2@operator.com
Accept-Contact: +g3gpp.group-comm
Content-Type: application/sdp
Content-Length: 57
c=IN IP4 224.2.17.12/127
m=video 49170/2 RTP/AVP 31
. . .

When receiving the SIP INVITE request to the third terminal device T3 704, the second terminal device T2 703 knows from the included feature tag that the request is for a group communication and it knows from the Request-URI "T3" that the request is destined for the third terminal device T3 704. The second terminal device's T2 703 SIP address for group communication relay included in the Route header may indicate to the second terminal device T2 703 that it should relay the SIP INVITE request to the third terminal device T3 704 for a group communication. Therefore, the second terminal device T2 703 may insert a Back-to-Back User Agent (B2BUA) for relaying the group communication SIP messages to the third terminal device T3 704.

The SIP INVITE request does not contain an "a=recvonly" attribute in its SDP body. Therefore, the second terminal device T2 703 stores in 714 the on hold status "off hold" for the third terminal device T3 704.

Then, the second terminal device T2 703 may remove all codecs which the second terminal device T2 703 is not supporting from the SDP body of the SIP INVITE request. Furthermore, the second terminal device T2 703 may remove its relay address from the Route header of the INVITE request and may send the request in 708 to the third terminal device T3 704 via its direct connection to the third terminal device T3 704.

The third terminal device T3 704 may accept the call by sending back a SIP 200 OK response in 709. The second terminal device's T2 703 B2BUA may forward in 710 the response to the ProSe server PS 702. The second terminal device T2 703 may also accept the group communication call for itself and may send back another corresponding SIP 200 OK response in 711 to the server PS 702.

Then, the second terminal device T2 703 may send in 712 a SIP UPDATE request for the third terminal device T3 704 to the server PS 702 including an "a=sendonly" attribute and otherwise unchanged SDP in its body. The server PS 702 may accept the request by sending back a SIP 200 OK response in 713. The attribute "a=sendonly" may set the third terminal device T3 704 "on hold" in 715 at the server disabling transmission of communication data to the third terminal device T3 704.

The content of the SIP UPDATE request in 712 may be as follows:

UPDATE sip:ProSe@operator.com SIP/2.0
To: <sip:ProSe@operator.com>
From: <sip:T3@operator.com>; tag=ghsd
Call-ID: 7632gwhndb
Accept-Contact: +g3gpp.group-comm
Content-Type: application/sdp
Content-Length: 57
a=sendonly
c=IN IP4 224.2.17.12/127
m=video 49170/2 RTP/AVP 31
. . .

Initialization of a B2BUA and an RTP/RTCP translator for group communication relay can be triggered by requesting group communication relay capabilities from the relaying terminal device, e.g. when the relaying terminal device receives a relevant SIP OPTIONS request.

Figure 8:
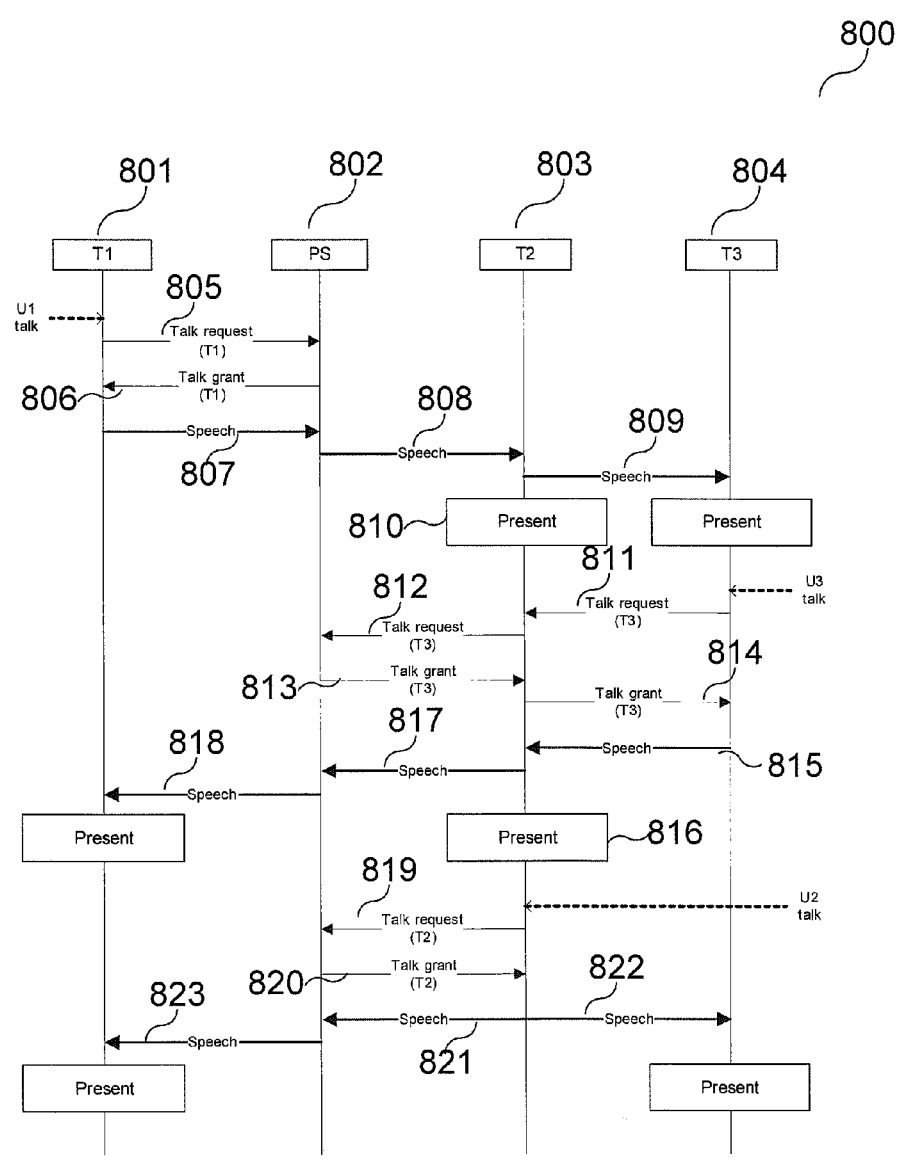
FIG. 8 shows a message flow diagram for group communication.

FIG. 8 shows a message flow diagram 800 for group communication.

FIG. 8 shows a first terminal device T1 801, a second terminal device T2 803, and a third terminal device T3 804, as well as a ProSe server PS 802.

In this example, it is assumed that the first user U1 wants to speak to the second user U2 and the third user U3. The first user's U1 terminal device T1 801 requests in 805 the right to speak from the server PS 802 and after receipt of permission, in 806, may send speech data in 807 via RTP/RTCP to the server PS 802. The server PS 802 PS may forward the data in 808 to the second terminal device T2 803, but not to the third terminal device T3 804, since the third terminal device T3 804 is "off hold" at the server PS 802.

When receiving the speech data, the second terminal device T2 803 may check the stored on hold status for the third terminal device T3 804 and may forward, in 809, the data to the third terminal device T3 804, since the stored on hold status for the third terminal device T3 804 is "off hold". The second terminal device T2 803 may also present the received data in 810 to its second user U2.

Now, it is assumed that the third user U3 wants to speak to the first user U1 and the second user U2. The third user's U3 terminal device T3 804 may request, in 811, the right to speak from the server PS 802. The second terminal device T2 803 may forward, in 812, the request and response. After receipt of talk permission in 813, 814, the third terminal device T3 804 may send speech data via RTP/RTCP in 815 to the second terminal device T2 803. The second terminal device T2 803 may present the data, in 816, to its second user U2 and may forward the data in 817 to the server PS 802.

The server PS 802 then distributes the received data in 818 to the first terminal device T1 801 but not to the third terminal device T3 804, since the third terminal device T3 804 is set "on hold" at the server PS 802, and not to the second terminal device T2 803, since the second terminal device T2 803 is the third terminal device's T3 804 relay and therefore already received the data.

Then, it is assumed that the second user U2 wants to speak to the first user U1 and the third user U3. The second terminal device T2 803 may request in 819 the right to speak from the server PS 802 and after receipt of permission in 820, may send speech data via RTP/RTCP in 821 to the server PS 802 and in 822 to the third terminal device T3 805.

The server PS 802 may forward the data, in 823, to the first terminal device T1 801, but not to the second terminal device T2 803, since the data originates from the second terminal device T2 803 and the third terminal device T3 804 is "on hold" at the server PS 802.

Figure 9:
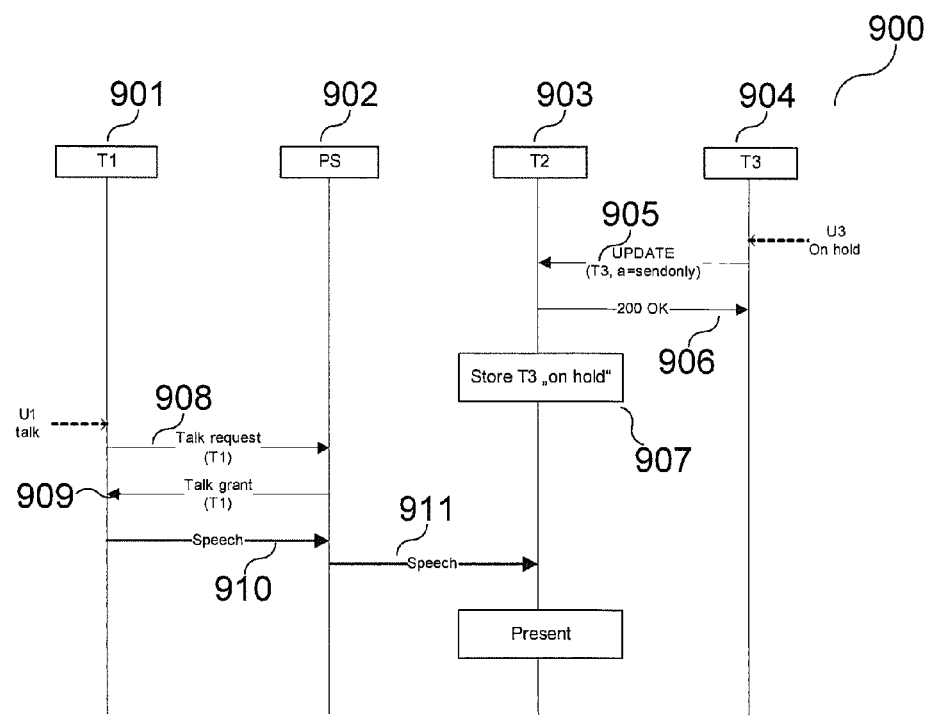
FIG. 9 shows a message flow diagram for group communication with a relayed terminal device being "on hold"

FIG. 9 shows a message flow diagram 900 for group communication with relayed terminal device being "on hold".

FIG. 9 shows a first terminal device T1 901, a second terminal device T2 903, and a third terminal device T3 904, as well as a ProSe server PS 902.

It is assumed that the third user U3 does not want to be disturbed by the group call for a while and therefore wants to put the call "on hold". The third user's U3 terminal device T3 904 may send a SIP UPDATE request, in 905, to the second terminal device T2 903 with an "a=sendonly" attribute and otherwise unchanged SDP in its body.

The second terminal device's T2 903 B2BUA may accept the SIP UPDATE request by sending in 906 back a SIP 200 OK response and may store the on hold status "on hold" in 907 for the third terminal device T3 904.

Furthermore, it is assumed that the first user U1 wants to speak to the second user U2 and the third user U3. The first user's U1 terminal device T1 901 may request, in 908, the right to speak from the server PS 902 and after receipt of permission in 909 may send speech data in 910 via RTP/RTCP to the server PS 902. The server PS 902 may forward the data in 911 to the second terminal device T2 903. The second terminal device T2 903 may present the data to its second user U2, but does not forward the data to the third terminal device T3 904, since the third terminal device's T3 904 on hold status is "on hold" at the second terminal device T2 903.

As an alternative to the example shown in FIG. 9, if the second terminal device T2 903 is "on hold" but the third terminal device T3 904 is "off hold" then the second terminal device T2 903 may set the second terminal device T2 903 "on hold" and the third terminal device T3 904 "off hold" at the server PS 902. In this case, the second terminal device T2 903 will receive communication data destined for the third terminal device T3 904, but will not receive communication data destined for the second terminal device T2 903. The second terminal device T2 903 does not present data received for the third terminal device T3 904, but forwards the data to the third terminal device T3 904.

Figure 10:
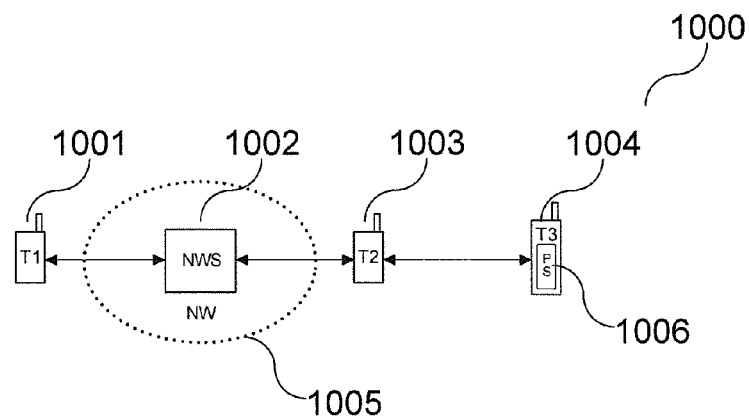
FIG. 10 shows a communication system architecture with network and direct communication connections and group communication server implemented in a terminal device.

FIG. 10 shows a communication system architecture 1000 with a network and direct communication connections and a group communication server implemented in a terminal device.

The first user's U1 terminal device T1 1001 and the second user's U2 terminal device T2 1003 are wirelessly connected to the communication system's wireless network 1005 including a network server 1002. The third user's U3 terminal device T3 1004 is not connected to the system's network 1005 since it is out of reach of the network's base stations.

Instead to group communication provided by a group communication server located in the network, as shown for example in FIG. 3, the group communication can be provided by a group communication server 1006 located in a terminal device, e.g. located in the third user's U3 terminal device T3 1004. In this case, the relaying terminal device T2 1003 may be connected to the group communication server terminal device T3 1004 and to the network 1005 and it relays group communication data between the group communication server terminal device T3 1004 and another terminal device T1 1001 connected via the network 1005.

In the example shown in FIG. 10, the network 1005 may provide pure IP connections without group communication functionality.

The relaying device T2 1003 may provide a group communication relay functionality as described in connection with the examples shown in FIG. 7 to FIG. 9.

Figure 11:
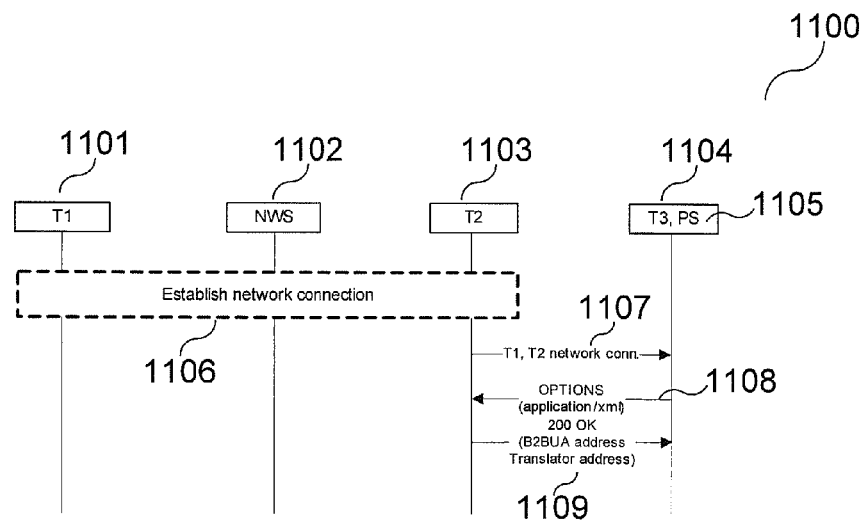
FIG. 11 shows a message flow diagram for setting up a group communication relay with a group communication server.

FIG. 11 shows a message flow diagram 1100 for setting up a group communication relay with group communication server PS 1105 implemented in the third terminal device T3 1104.

FIG. 11 shows a first terminal device T1 1101, a second terminal device T2 1103, and a third terminal device T3 1104, as well as a server NWS 1102 and a ProSe server PS 1105 implemented in the third terminal device T3 1104.

The first terminal device T1 1101 and the second terminal device T2 1103 may come into the reachability region of a network's base station. Therefore, they may establish a network based communication between each other in 1106 managed by a network server NWS 1102. The second terminal device T2 1103 may inform, in 1107, the ProSe server PS 1105, located at the third terminal device T3 1104, that the second terminal device T2 1103 and the first terminal device T1 1101 can communicate to each other via a network connection.

Then the server PS 1105 checks whether the second terminal device T2 1103 supports group communication relay functionality by sending a SIP OPTIONS request in 1108 to the second terminal device T2 1103. The SIP OPTIONS request may include an Accept header value "application/xml".

Since the second terminal device T2 1103 supports ProSe group communication relay functionality, it may respond with a SIP 200 OK response including an XML body containing the SIP address of the second terminal device's T2 1103 Back-To-Back User Agent (B2BUA) for group communication control data relay and the second terminal device's T2 1103 RTP translator address for RTP/RTCP data relay in 1109.

Figure 12:
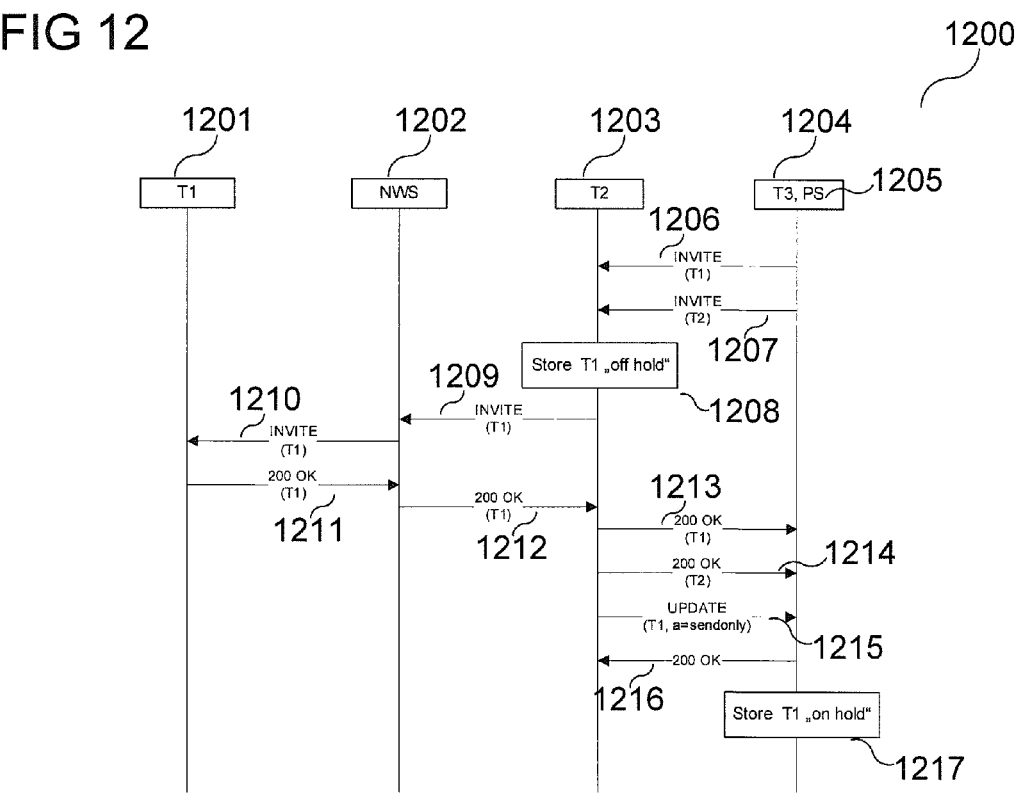
FIG. 12 shows a message flow diagram for setting up a group communication call with relay and group communication server implemented in a terminal device.

FIG. 12 shows a message flow diagram 1200 for setting up a group communication call with relay and group communication server PS 1205 implemented in the third terminal device T3 1204.

FIG. 12 shows a first terminal device T1 1201, a second terminal device T2 1103, and a third terminal device T3 1204, as well as a server NWS 1202 and a ProSe server PS 1205 implemented in the third terminal device T3 1204.

It is assumed that a third user U3 initiates a group call with the second terminal device T2 1203 and the first terminal device T1 1201 with his third terminal device T3 1204. The server PS 1205 may initiate one or more communication sessions with the second terminal device T2 1203 and the first terminal device T1 1201 by sending SIP INVITE requests in 1206 and 1207 to the second terminal device T2 1203 and the first terminal device T1 1201. The SIP INVITE request in 1206 to the first terminal device T1 1201 may include a Route header value "gcr.T1@operator.com" in order to force the request to be routed through the first terminal device T1 1201.

When receiving the SIP INVITE request to the first terminal device T1 1201, the second terminal device T2 1203 knows from the included feature tag that the request is for a group communication and it knows from the Request-URI "T1" that the request is destined for the first terminal device T1 1201. The second terminal device's T2 1203 SIP address for group communication relay included in the Route header may indicate to the second terminal device T2 1203 that it should relay the SIP INVITE request to the first terminal device T1 1201 for group communication. Therefore, the second terminal device T2 1203 may insert a Back-to-Back User Agent (B2BUA) for relaying the group communication SIP messages to the first terminal device T1 1201.

The SIP INVITE request does not contain an "a=recvonly" attribute in its SDP body. Therefore, the second terminal device T2 1203 may store, in 1208, the on hold status "off hold" for the first terminal device T1 1201.

Then, the second terminal device T2 1203 may remove all codecs which the second terminal device T2 1203 is not supporting from the SDP body of the SIP INVITE request. Furthermore, the second terminal device T2 1203 may remove its relay address from the Route header of the INVITE request and may send the request, in 1209, to the first terminal device T1 1201 via its network connection over the network server NWS 1202 to the first terminal device T1 1201.

The first terminal device T1 1201 may accept the call by sending back a SIP 200 OK response in 1211. The SIP 200 OK response of the first terminal device T1 1201 may be forwarded in 1212 by the network server NWS 1202 to the second terminal device T2 1203. The second terminal device's T2 1203 B2BUA may forward, in 1213, the response to the ProSe server PS 1205. The second terminal device T2 1203 may also accept the group communication call for itself and may send back another corresponding SIP 200 OK response in 1214 to the server PS 1205.

Then, the second terminal device T2 1203 may send, in 1215, a SIP UPDATE request for the first terminal device T1 1201 to the server PS 1205 including an "a=sendonly" attribute and otherwise unchanged SDP in its body. The server PS 1205 may accept the request by sending back a SIP 200 OK response in 1216. The attribute "a=sendonly" may set the first terminal device T1 1201 "on hold" in 1217 at the server PS 1205 disabling transmission of communication data to the first terminal device T1 1201.

Figure 13:
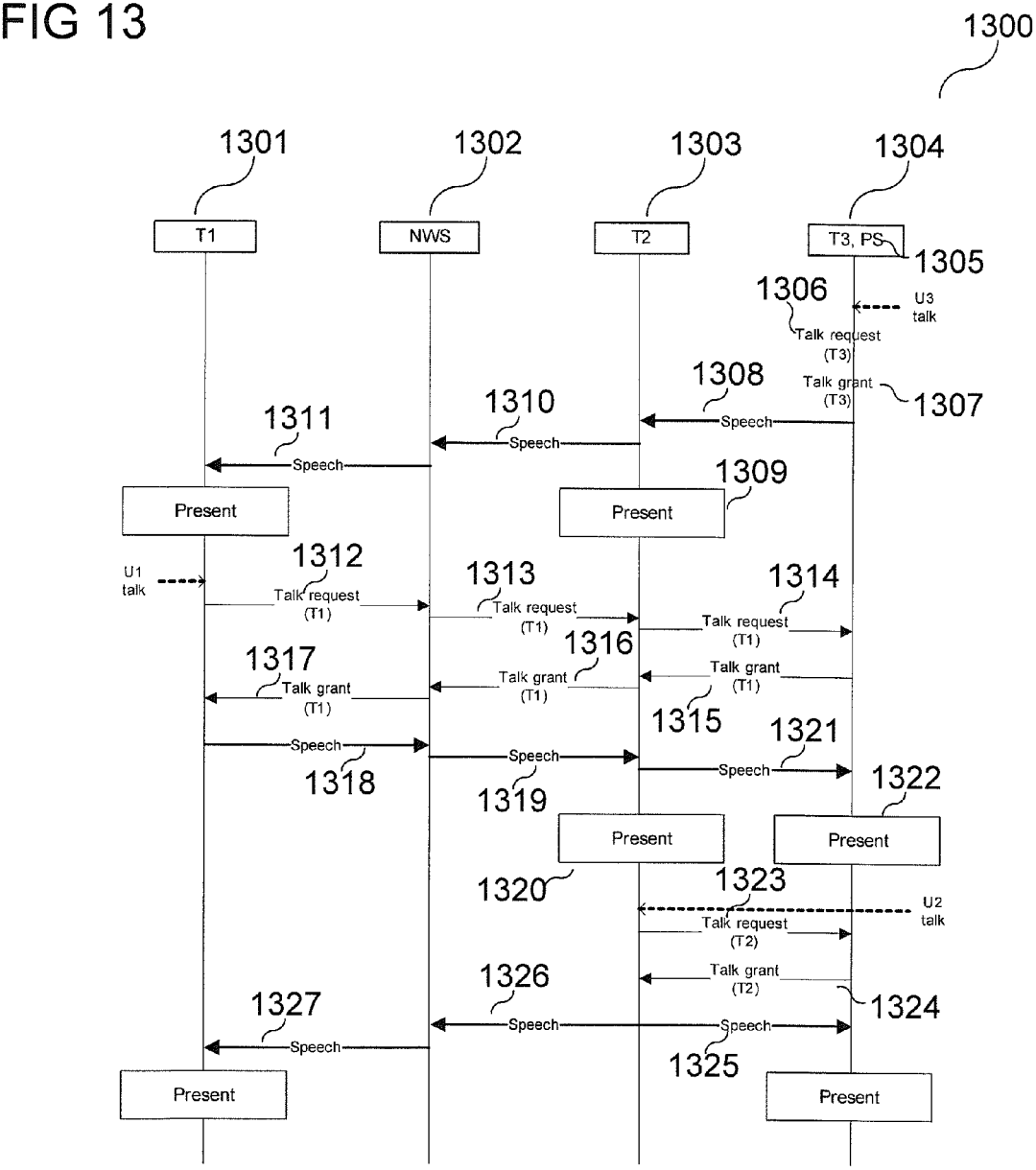
FIG. 13 shows a message flow diagram for group communication with group communication server implemented in a terminal device.

FIG. 13 shows a message flow diagram 1300 for a group communication with a group communication server PS 1305 implemented in the third terminal device T3 1304.

FIG. 13 shows a first terminal device T1 1301, a second terminal device T2 1303, and a third terminal device T3 1304, as well as a server NWS 1302 and a ProSe server PS 1305 implemented in the third terminal device T3 1304.

It is assumed that the third user U3 wants to speak to the second user U2 and to the first user U1. The third user's U3 terminal device T3 1304 may request, in 1306, the right to speak from the server PS 1305 and after receipt of permission, in 1307, may forward speech data, in 1308, to the second terminal device T2 1303, but not to the first terminal device T1 1301, since the first terminal device T1 1301 is "off hold" at the server PS 1305.

When receiving the speech data, the second terminal device T2 1303 may check the stored on hold status for the first terminal device T1 1301 and may forward, in 1310, the data to the network server NWS 1302 and, in 1311, to the first terminal device T1 1301, since the stored on hold status for the first terminal device T1 1301 is "off hold". The second terminal device T2 1303 may also present the received data in 1309 to its second user U2.

Now, it is assumed that the first user U1 wants to speak to the second user U2 and to the third user U3. The first user's U1 terminal device T1 1301 may request, in 1312, the right to speak from the server PS 1305. The second terminal device T2 1303 may forward, in 1313, 1314, 1316, 1317 the request and response. After receipt of talk permission in 1317, the first terminal device T1 1301 may send speech data via RTP/RTCP in 1318 over the network server NWS 1302, in 1319, to the second terminal device T2 1303. The second terminal device T2 1303 may forward the data, in 1321, to the server PS 1305. The second terminal device T2 1303 may present the data in 1320 to its second user U2.

The third terminal device T3 1304 may then present the received data in 1322 to its third user U3. The data is not distributed to the second terminal device T2 1303, since the second terminal device T2 1303 is the first terminal device's T1 1301 relay and therefore already received the data and presented in 1320 to the second user U2.

Then, the second user U2 may want to speak to the first user U1 and to the third user U3. The second terminal device T2 1303 may request, in 1323, the right to speak from the server PS 1305 and after receipt of permission, in 1324, may send speech data via RTP/RTCP in 1325 to the server PS 1305 and, in 1326, to the network server NWS 1302. The network server NWS 1302 may forward the data in 1327 to the first terminal device T1 1301.

The server PS 1305 may not forward the data to T1 1301, since the data originates from the second terminal device T2 1303 and the first terminal device T1 1301 is "on hold" at the server PS 1305.

Figure 14:
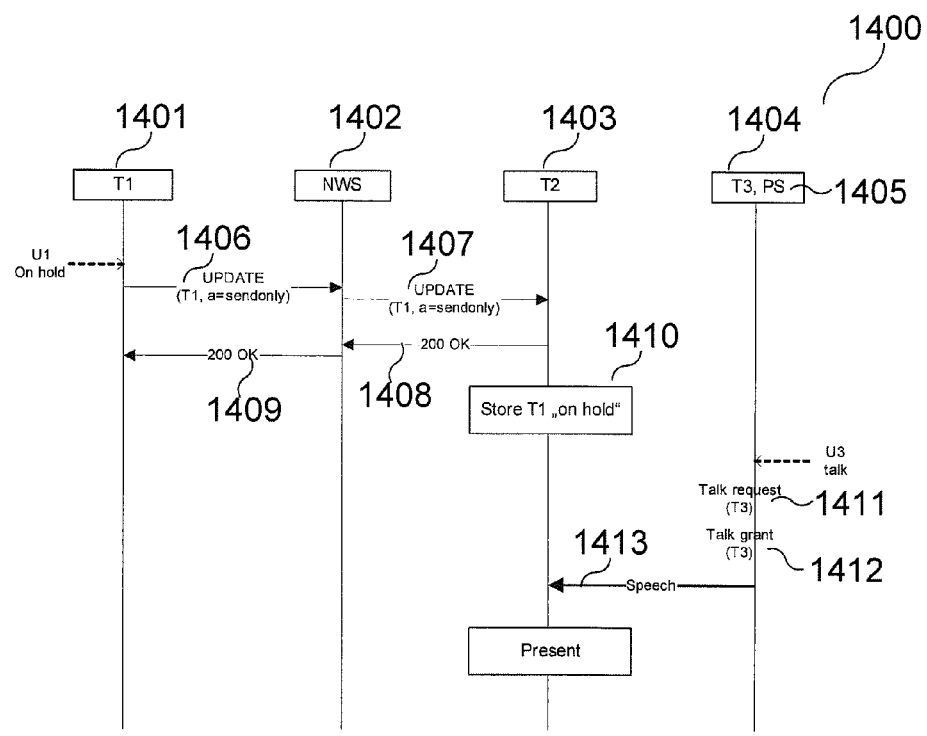
FIG. 14 shows a message flow diagram for group communication with a relayed terminal device being "on hold" and a group communication server implemented in a terminal device.

FIG. 14 shows a message flow diagram 1400 for group communication with a relayed terminal device "on hold" and group communication server PS 1405 on another terminal device T3 1404.

It is assumed that the first user U1 may not want to be disturbed by the group call for a while and therefore wants to put the call "on hold". The first user's U1 terminal device T1 1401 may send a SIP UPDATE request, in 1406, to the network server NWS 1402, which may forward the request, in 1407, to the second terminal device T2 1403 with an "a=sendonly" attribute and otherwise unchanged SDP in its body.

The second terminal device's T2 1403 B2BUA may accept the SIP UPDATE request by sending, in 1408, 1409, back a SIP 200 OK response and may store the on hold status "on hold" in 1410 for the first terminal device T1 1401.

The third user U3 may want to speak to the first user U1 and to the second user U2. The third user's U3 terminal device T3 1404 may request, in 1411, the right to speak from the server PS 1405 and after receipt of permission, in 1412, may send speech data, in 1413, via RTP/RTCP to the second terminal device T2 1403. The second terminal device T2 1403 may present the data to its second user U2, but does not forward the data to the first terminal device T1 1401, since the first terminal device's T1 1401 on hold status is "on hold" at the second terminal device T2 1403.

As an alternative to the example shown in FIG. 14, if the second terminal device T2 is "on hold", but the first terminal device T1 is "off hold", then the second terminal device T2 may set the second terminal device T2 "on hold" and the first terminal device T1 "off hold" at the server PS. In this case, the second terminal device T2 will receive communication data destined for the first terminal device T1, but will not receive communication data destined for the second terminal device T2. The second terminal device T2 does not present data received for the first terminal device T1, but forwards the data to the first terminal device T1.

Figure 15:
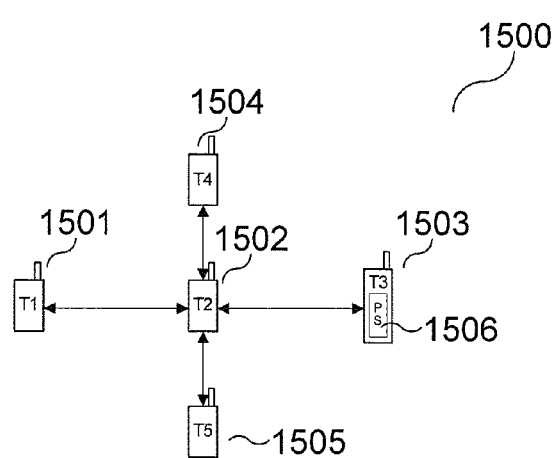
FIG. 15 shows a communication system architecture with a group communication server implemented in a terminal device without network connections and with a single relaying terminal device.

FIG. 15 shows a communication system architecture 1500 with group communication server PS 1506 on a terminal device T3 1503 without network connections and with a single relaying terminal device T2 1502.

As shown in FIG. 15, the method can be applied to group communications with a group communication server PS 1506 implemented in a terminal device T3 1503 without any network connection. The relaying terminal device may be the group communication server terminal device or another terminal device participating in the group communication. Several relaying terminal devices may be used or a single relaying terminal device may be used. In the example shown in FIG. 15, a single relaying terminal device T2 1502 may be used. The relaying terminal device T2 1502 relays group communication data for all terminal devices T1 1501, T3 1503, T4 1504 and T5 1505 (except itself). The single relaying terminal device T2 1502 may be different from the group communication server terminal device T3 1503.

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A first communication terminal device comprising:
   storage circuitry to store a first communication status of a second communication terminal device; and
   a controller, coupled with the storage circuitry, to set the first communication status to a first state and to cause transmission of a message to a group communication server to set a second communication status of the second communication terminal device to a second state at the group communication server, the second state to prevent the group communication server from sending transmissions to the second communication terminal device.

2. The first communication terminal device of claim 1, wherein the first communication status is an on-hold status.

3. The first communication terminal device of claim 2, wherein the first state is off hold and the second state is on hold.

4. The first communication terminal device of claim 1, wherein the controller is to modify a session initiation protocol (SIP) message received from the group communication server and cause the modified SIP message to be transmitted to the second communication terminal device.

5. The first communication terminal device of claim 4, wherein the SIP message is a SIP INVITE request directed to the second communication terminal device and the controller is to modify the SIP INVITE request by removing all codecs not supported by the first communication terminal device from a session description protocol (SDP) body of the SIP INVITE request.

6. The first communication terminal device of claim 5, wherein the controller is to further modify the SIP INVITE request by removing a relay address corresponding to the first communication terminal device from a route header of the SIP INVITE request.

7. The first communication terminal device of claim 1, further comprising:
   cellular communication circuitry to communicate with the group communication server over a cellular network; and
   device-to-device communication circuitry to communicate with the second communication terminal device.

8. The first communication terminal device of claim 1, wherein the controller is to receive a session initiation protocol (SIP) OPTIONS request from the group communication server inquiring as to whether the first communication terminal device supports group communication relay functionality, and to cause transmission of a SIP 200 OK response including a SIP address of a back-to-back user agent for group communication control data relay and a real time protocol (RTP) translator address for RTP/RTP control protocol (RTCP) data relay.

9. One or more non-transitory, computer-readable media having instructions that, when executed, cause a first communication terminal device to:
   set a first communication status of a second communication terminal device to a first state; and
   cause transmission of a message to a group communication server to set a second communication status of the second communication terminal device to a second state at the group communication server, the second state to prevent the group communication server from sending transmissions to the second communication terminal device.

10. The one or more non-transitory, computer-readable media of claim 9, wherein the first communication status is an on-hold status.

11. The one or more non-transitory, computer-readable media of claim 10, wherein the first state is off hold and the second state is on hold.

12. The one or more non-transitory, computer-readable media of claim 9, wherein the instructions, when executed, further cause the first communication terminal device to modify a session initiation protocol (SIP) message received from the group communication server and cause the modified SIP message to be transmitted to the second communication terminal device.

13. The one or more non-transitory, computer-readable media of claim 12, wherein the SIP message is a SIP INVITE request directed to the second communication terminal device and a controller is to modify the SIP INVITE request by removing all codecs not supported by the first communication terminal device from a session description protocol (SDP) body of the SIP INVITE request.

14. The one or more non-transitory, computer-readable media of claim 13, wherein to modify the SIP INVITE request includes removing a relay address corresponding to the first communication terminal device from a route header of the SIP INVITE request.

15. The one or more non-transitory, computer-readable media of claim 9, wherein the instructions, when executed, further cause the first communication terminal device to receive a session initiation protocol (SIP) OPTIONS request from the group communication server inquiring as to whether the first communication terminal device supports group communication relay functionality, and to cause transmission of a SIP 200 OK response including a SIP address of a back-to-back user agent for group communication control data relay and a real time protocol (RTP) translator address for RTP/RTP control protocol (RTCP) data relay.

* * * * *